(12) United States Patent
Tatsumi et al.

(10) Patent No.: US 8,254,289 B2
(45) Date of Patent: Aug. 28, 2012

(54) TRAIN CAR-TO-CAR COMMUNICATION DEVICE

(75) Inventors: Shogo Tatsumi, Chiyoda-ku (JP);
Ryoichi Watanabe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 668 days.

(21) Appl. No.: 12/521,948

(22) PCT Filed: Apr. 22, 2008

(86) PCT No.: PCT/JP2008/057762
§ 371 (c)(1),
(2), (4) Date: Jul. 1, 2009

(87) PCT Pub. No.: WO2009/072313
PCT Pub. Date: Jun. 11, 2009

(65) Prior Publication Data
US 2010/0020723 A1 Jan. 28, 2010

(30) Foreign Application Priority Data
Dec. 6, 2007 (JP) ................................. 2007-316085

(51) Int. Cl.
*H04L 12/28* (2006.01)
(52) U.S. Cl. ........................ 370/254; 709/220
(58) Field of Classification Search ........................ None
See application file for complete search history.

(56) References Cited

U.S. PATENT DOCUMENTS
| | | | |
|---|---|---|---|
| 5,803,411 A | 9/1998 | Ackerman et al. | |
| 6,049,296 A * | 4/2000 | Lumbis et al. | 340/933 |
| 6,172,619 B1 | 1/2001 | Lumbis et al. | |
| 2007/0208841 A1 | 9/2007 | Barone et al. | |

FOREIGN PATENT DOCUMENTS
| | | |
|---|---|---|
| EP | 0 836 978 A1 | 4/1998 |
| JP | 7 1962 | 1/1995 |
| JP | 09 028001 | 1/1997 |
| JP | 2004 032354 | 1/2004 |
| JP | 2004 201476 | 7/2004 |
| JP | 2005 039783 | 2/2005 |
| JP | 2005 159604 | 6/2005 |
| JP | 2005 168126 | 6/2005 |
| JP | 2005168126 * | 6/2005 |
| JP | 2006 020117 | 1/2006 |

OTHER PUBLICATIONS

Extended European Search Report issued Jan. 14, 2011, in Patent Application No. 08740752.4.

* cited by examiner

*Primary Examiner* — Jae Y Lee
(74) *Attorney, Agent, or Firm* — Oblon, Spivak, McClelland, Maier & Neustadt, L.L.P.

(57) ABSTRACT

A train car-to-car communication device includes: a terminal; an intra-composition transmission line connected to the terminal within the same composition for transmitting information; a composition-to-composition communication relay unit connected to the intra-composition transmission line for receiving first information from the terminal within the composition and transmitting the first information to an adjacent composition, and receiving second information from the adjacent composition and transmitting the second information to the terminal within the composition of interest; and a composition-to-composition transmission line for connecting the composition-to-composition communication relay units of the adjacent compositions and transmitting the information, and the composition-to-composition communication relay unit determines a difference between composition directions of the composition as a transmission source of the received information and the composition to which the composition-to-composition communication relay unit of interest belongs, and rewrites to invert direction-dependent information contained in the received information if the composition directions are different.

10 Claims, 13 Drawing Sheets

[FIG.1]
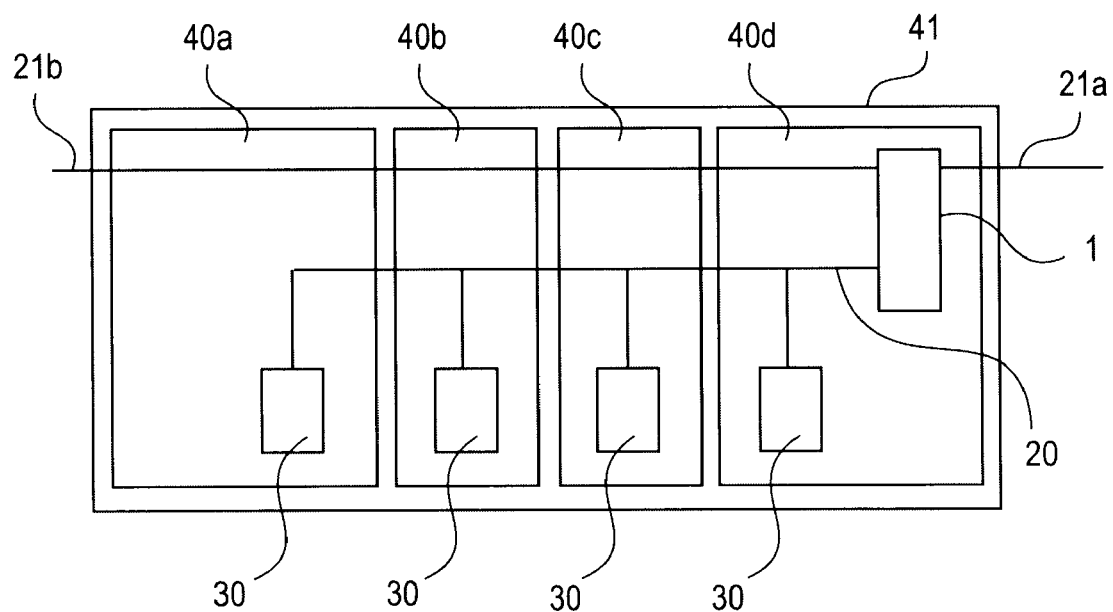
[FIG.2]
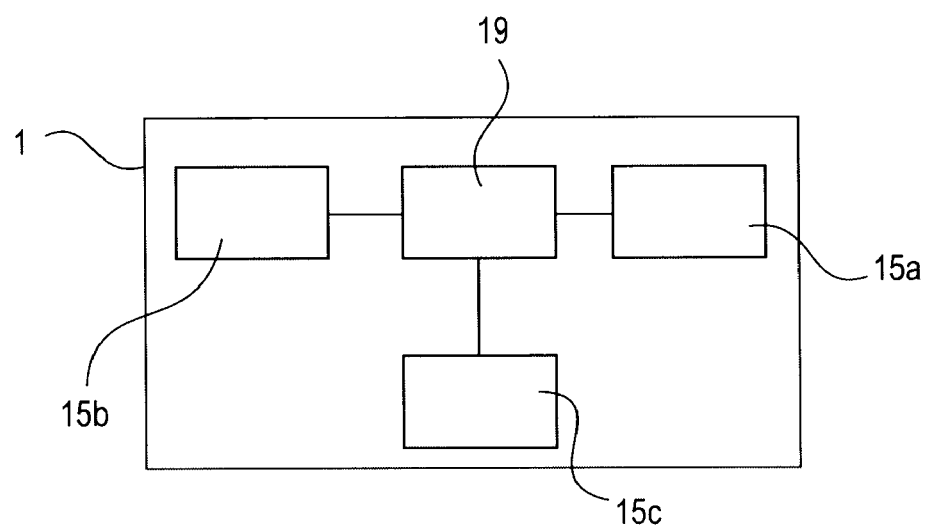

[FIG.3]
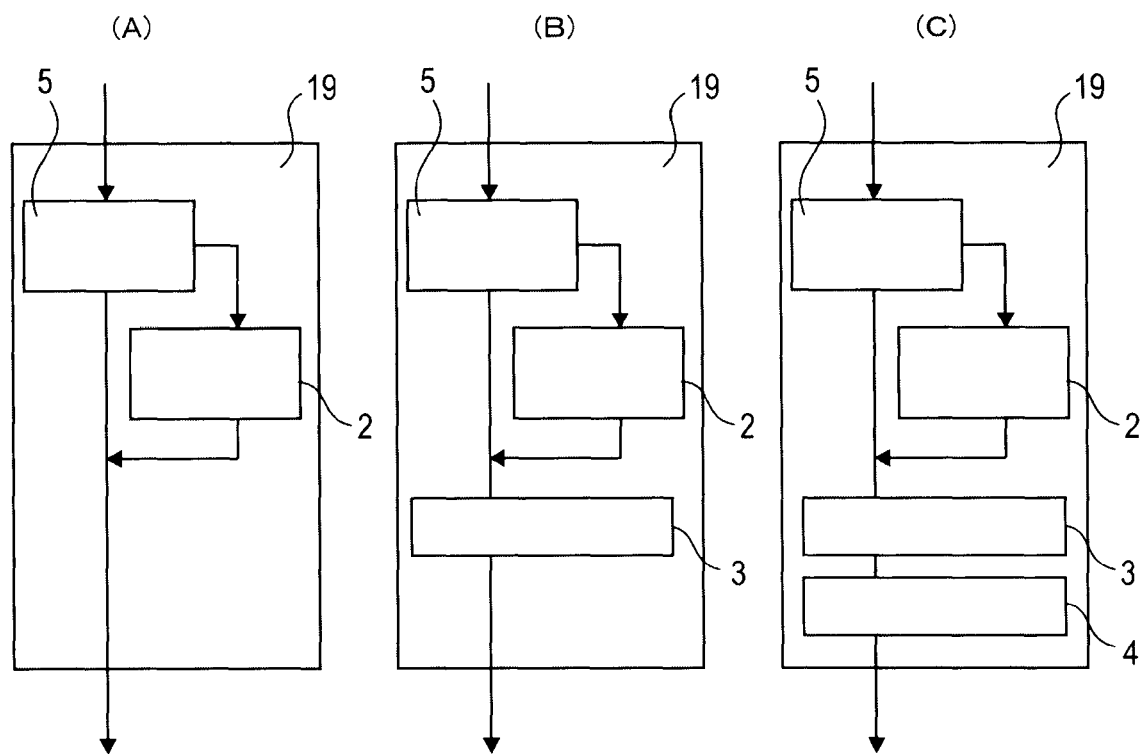
[FIG.4]
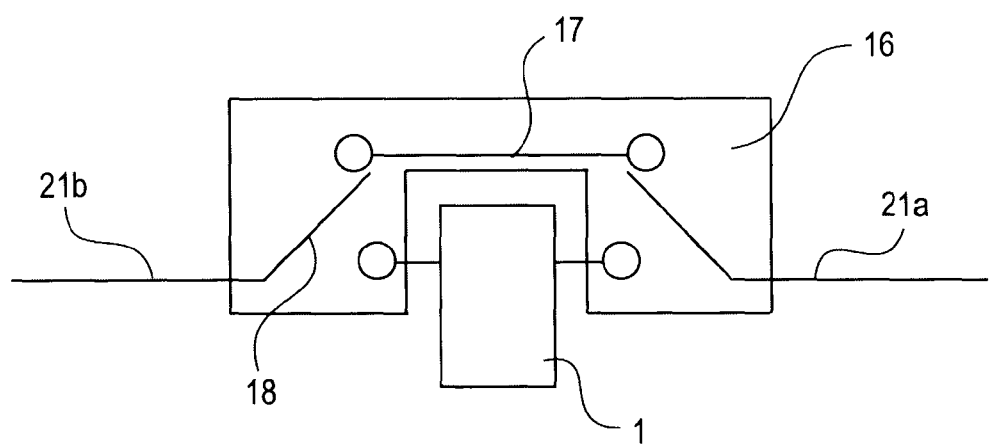

[FIG.5]
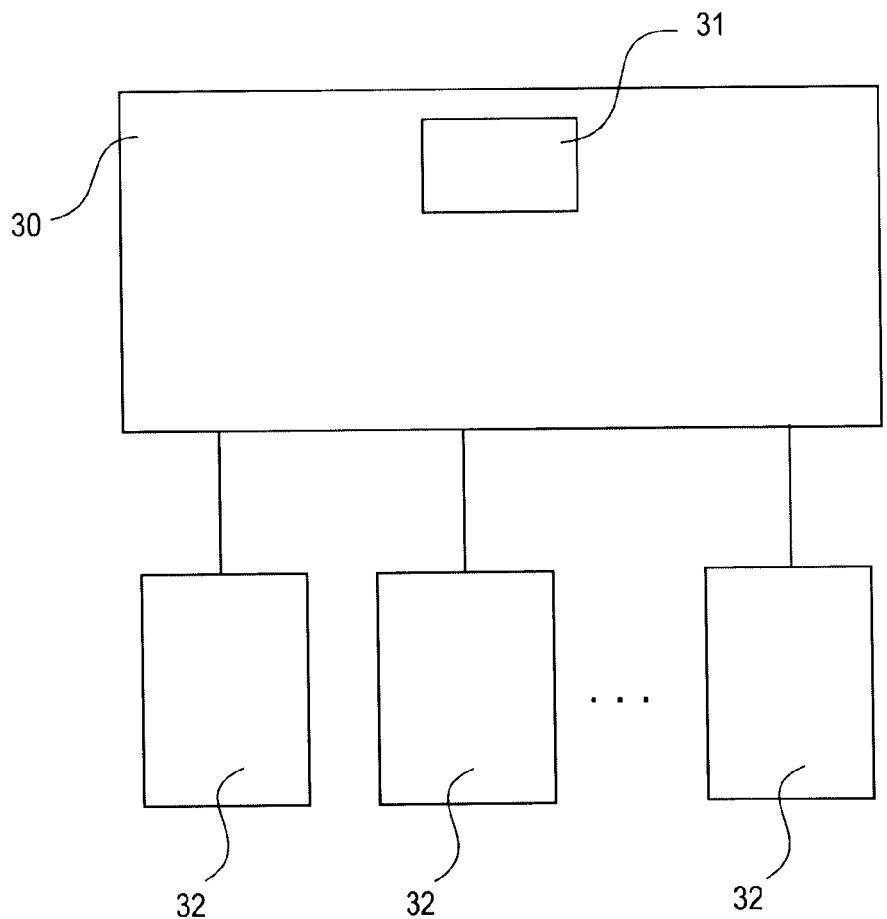
[FIG.6]
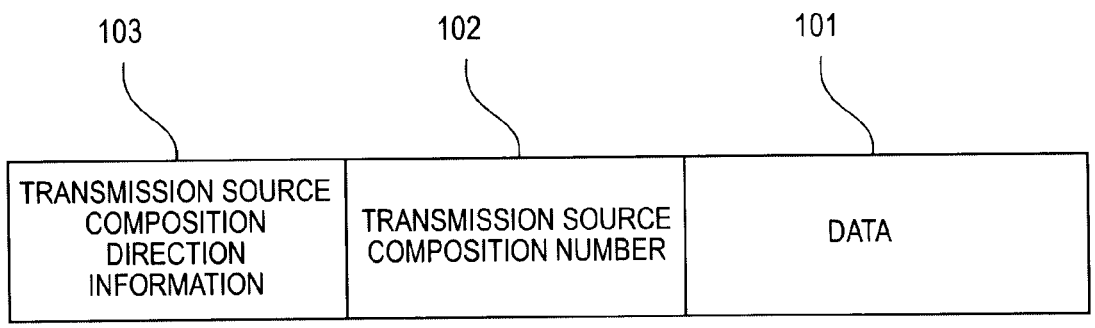

[FIG.7]

| TRANSMISSION SOURCE | RECEPTION PORT | DIFFERENCE IN COMPOSITION DIRECTION |
|---|---|---|
| a | a | OPPOSITE |
| b | a | SAME |
| a | b | SAME |
| b | b | OPPOSITE |

[FIG.8]
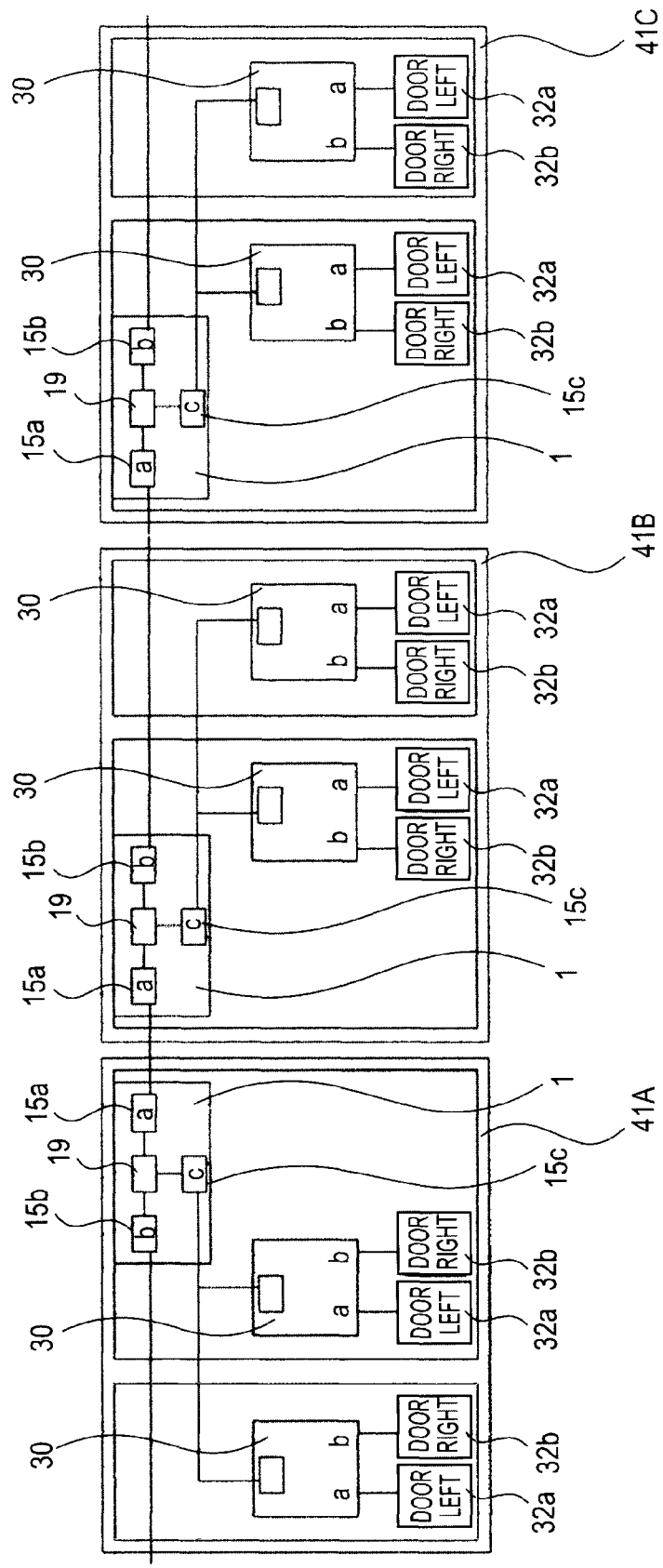

| DOOR RIGHT-OPEN |

(B)

| RANSMISSION SOURCE COMPOSITION DIRECTION INFORMATION b | TRANSMISSION SOURCE COMPOSITION NUMBER A | DOOR RIGHT-OPEN |

| TRANSMISSION SOURCE COMPOSITION DIRECTION INFORMATION a | TRANSMISSION SOURCE COMPOSITION NUMBER A | DOOR RIGHT-OPEN |

(C)

| TRANSMISSION SOURCE COMPOSITION DIRECTION INFORMATION a | TRANSMISSION SOURCE COMPOSITION NUMBER A | DOOR LEFT-OPEN |

[FIG.10]
(A)
DOOR LEFT-OPEN
| RANSMISSION SOURCE COMPOSITION DIRECTION INFORMATION b | TRANSMISSION SOURCE COMPOSITION NUMBER B | DOOR LEFT-OPEN |
(B)
| RANSMISSION SOURCE COMPOSITION DIRECTION INFORMATION b | TRANSMISSION SOURCE COMPOSITION NUMBER B | DOOR LEFT-OPEN |
[FIG.11]
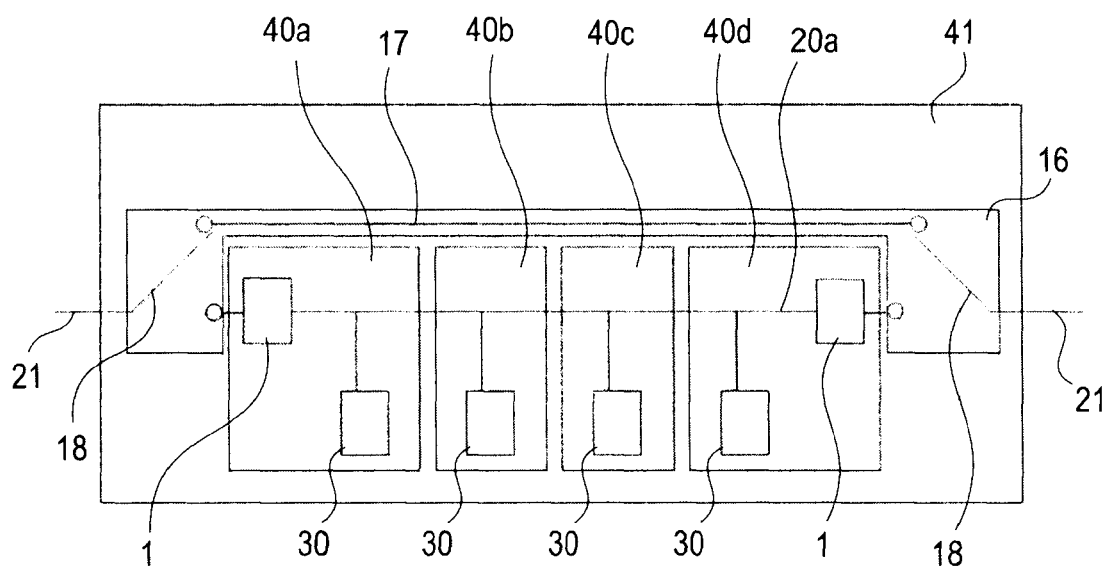

[FIG.12]

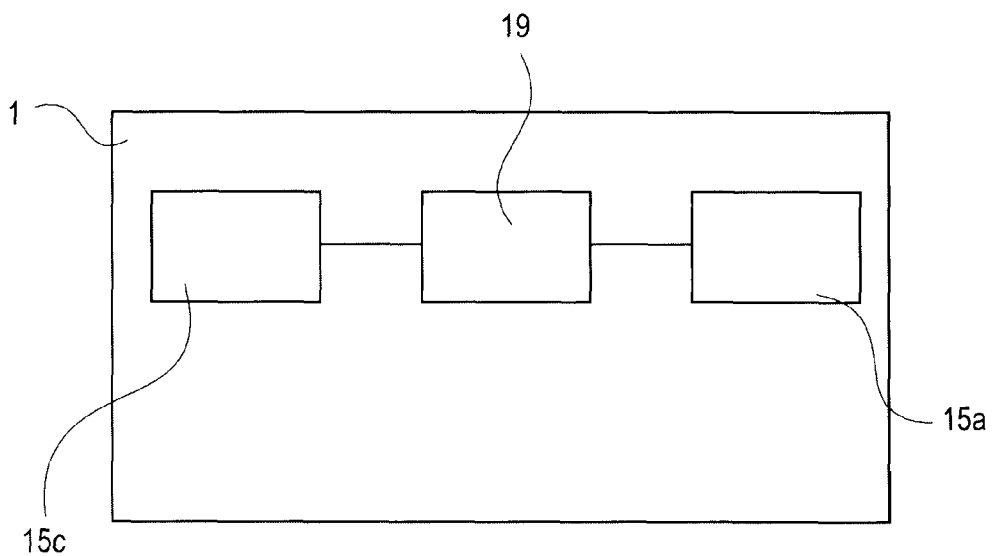

[FIG.13]

| IDENTIFIER OF TRANSMISSION SOURCE COMPOSITION-TO-COMPOSITION COMMUNICATION RELAY UNIT (TRANSMISSION SOURCE COMPOSITION DIRECTION INFORMATION CONTAINED IN PACKET) | IDENTIFIER OF TRANSMISSION SOURCE COMPOSITION-TO-COMPOSITION COMMUNICATION RELAY UNIT RECEIVING PACKET | DIFFERENCE IN COMPOSITION DIRECTION |
|---|---|---|
| a | a | OPPOSITE |
| b | a | SAME |
| a | b | SAME |
| b | b | OPPOSITE |

[FIG.14]
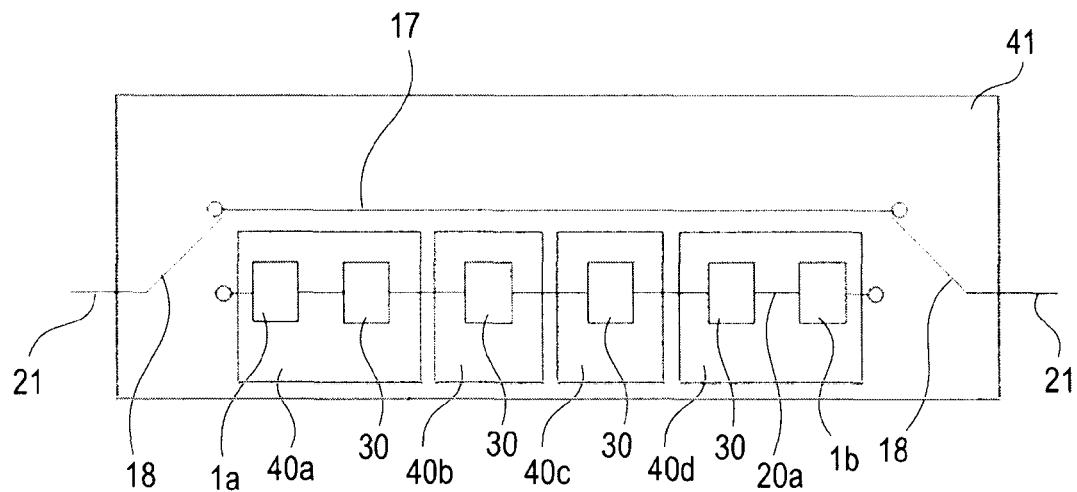
[FIG.15]
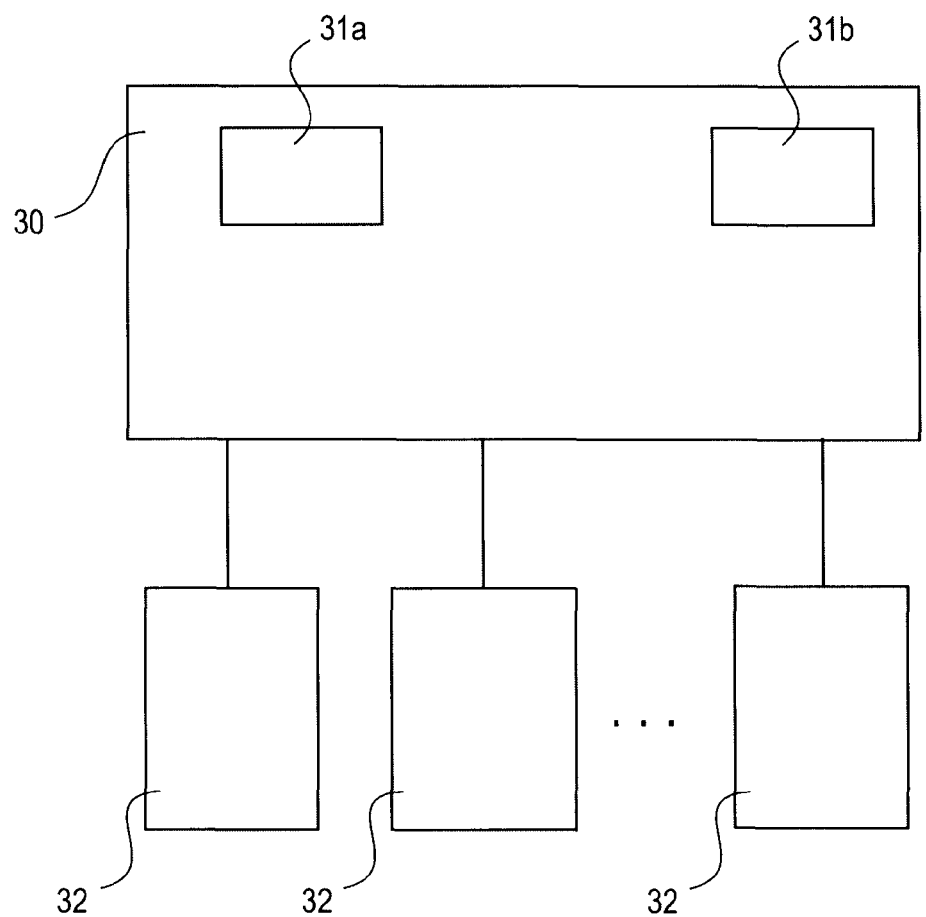

[FIG.16]
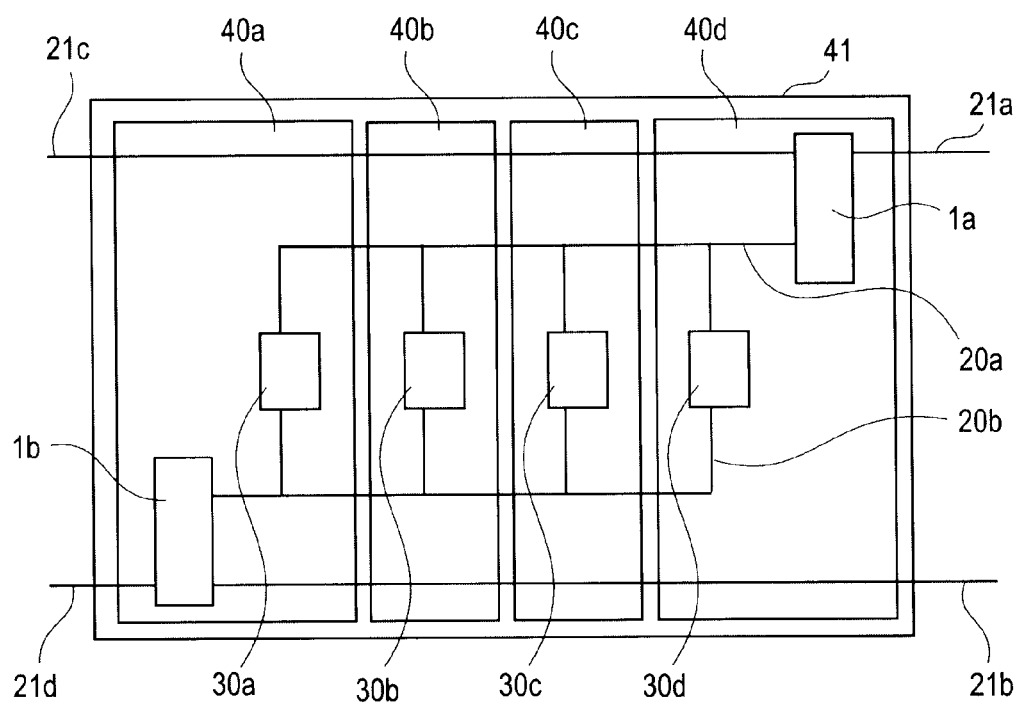
[FIG.17]
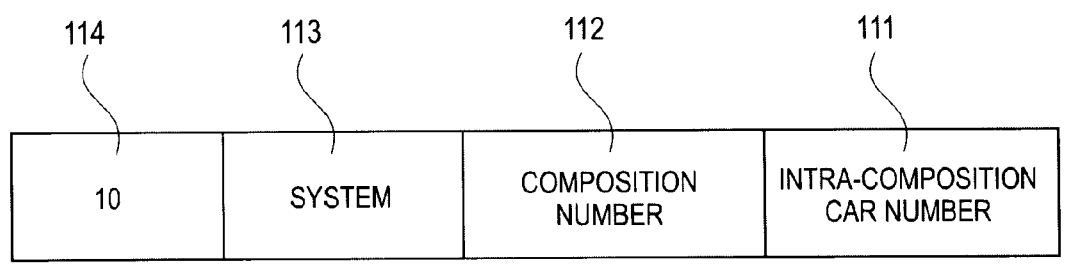

[FIG.18]

| SYSTEM (TRANSMISSION PORT) | CAR NUMBER | IP ADDRESS |
|---|---|---|
| 1(a) | 1 | 10.1.1.1 |
| 2(b) | 1 | 10.2.1.1 |
| 1(a) | 2 | 10.1.1.2 |
| 2(b) | 2 | 10.2.1.2 |
| 1(a) | 3 | 10.1.1.3 |
| 2(b) | 3 | 10.2.1.3 |
| 1(a) | 4 | 10.1.1.4 |
| 2(b) | 4 | 10.2.1.4 |

[FIG.19]

| SYSTEM OF TRANSMISSION SOURCE COMPOSITION-TO-COMPOSITION COMMUNICATION RELAY UNIT (TRANSMISSION SOURCE COMPOSITION DIRECTION INFORMATION CONTAINED IN PACKET) | SYSTEM OF TRANSMISSION SOURCE COMPOSITION-TO-COMPOSITION COMMUNICATION RELAY UNIT RECEIVING PACKET | DIFFERENCE IN COMPOSITION DIRECTION |
|---|---|---|
| 1 | 1 | SAME |
| 2 | 1 | OPPOSITE |
| 1 | 2 | OPPOSITE |
| 2 | 2 | SAME |

[FIG.20]
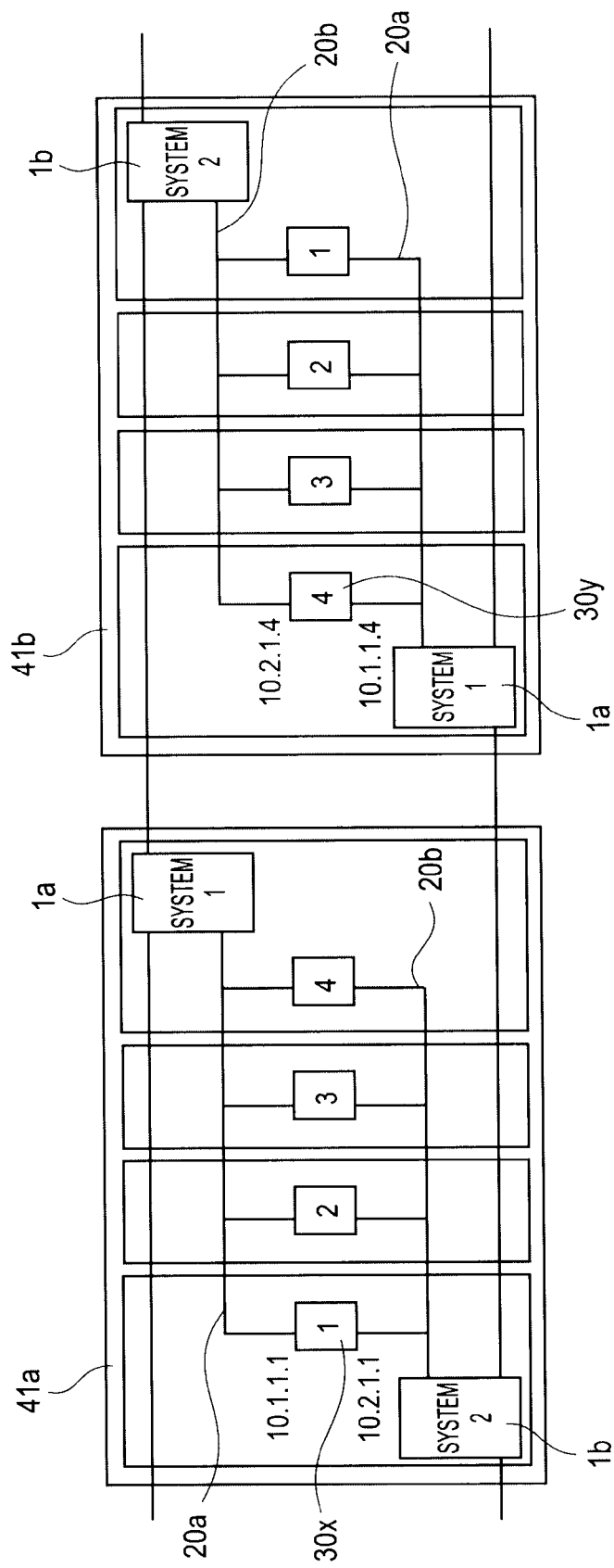

[FIG.21]

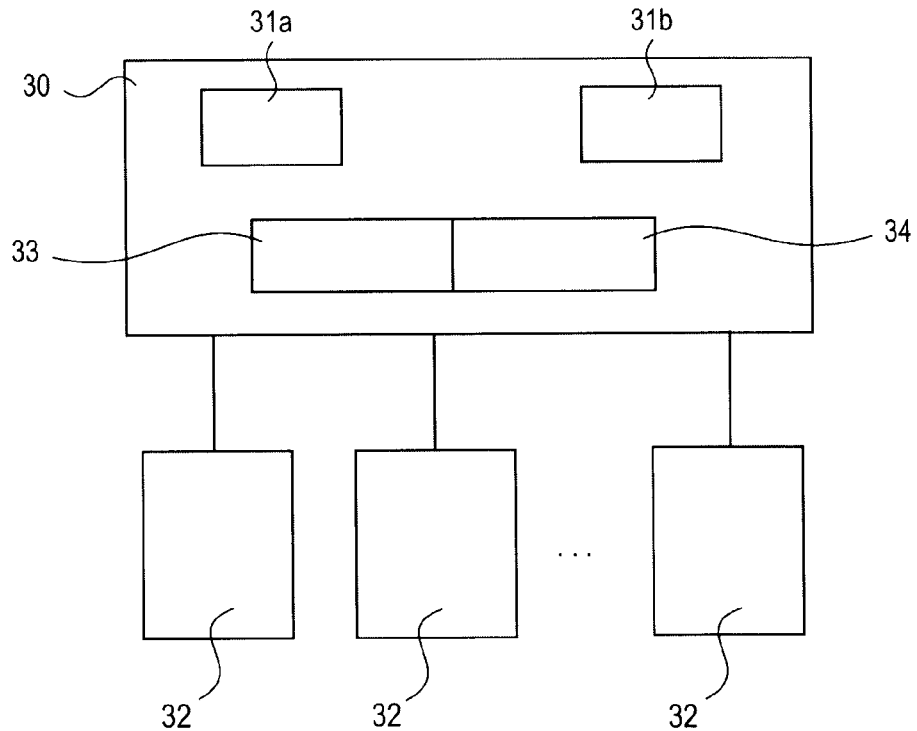

| DESTINATION: 10.2.1.4 | TRANSMISSION SOURCE: 10.2.1.1 | DATA |
|---|---|---|

(B)

| TRANSMISSION SOURCE COMPOSITION DIRECTION INFORMATION SYSTEM 2 | TRANSMISSION SOURCE COMPOSITION NUMBER 1 | DESTINATION: 10.2.1.4 | TRANSMISSION SOURCE: 10.2.1.1 | DATA |
|---|---|---|---|---|

(C)

| TRANSMISSION SOURCE COMPOSITION DIRECTION INFORMATION SYSTEM 1 | TRANSMISSION SOURCE COMPOSITION NUMBER 2 | DESTINATION: 10.1.1.4 | TRANSMISSION SOURCE: 10.1.1.1 | DATA |
|---|---|---|---|---|

(D)

| DESTINATION: 10.1.1.4 | TRANSMISSION SOURCE: 10.1.1.1 | DATA |
|---|---|---|

TRAIN CAR-TO-CAR COMMUNICATION DEVICE

TECHNICAL FIELD

The present invention relates to a communication device used for communication within a car, between cars, and between compositions including one or more cars of a train in a railroad or the like.

BACKGROUND ART

In a train in which two compositions having different composition directions are coupled, a problem that doors indicating the right side in one composition and doors indicating the right side in the other composition are doors on the opposite sides to each other arises. In order to solve the problem, a method of resolving the disagreement in recognition of upstream and downstream directions between communication relay units on a transmission line is disclosed (e.g., see Patent Document 1). Specifically, when compositions having different composition directions are coupled, the recognition of upstream and downstream directions is inversed in all communication relay units within one composition, and thereby, agreement is obtained in recognition of upstream and downstream directions of communication relay units between compositions.

Patent Document 1: JP-A-2005-168126

DISCLOSURE OF THE INVENTION

Problems that the Invention is to Solve

In a conventional train car-to-car communication network, it is necessary to disrupt communication during execution of processing of inverting the recognition of upstream and downstream directions in communication relay units within one composition. When the communication is disrupted, a problem of delay of processing occurs. Further, to disrupt the communication, it is necessary to provide complicated means for reliable disruption during communication processing, and thus, there are problems that the time for communication disruption increases and errors become easier to occur.

The invention has been achieved to solve the above described problems, and a purpose of the invention is to obtain a train car-to-car communication network capable of continuous communication processing without disruption of communication processing when compositions in different composition directions are coupled.

Means for Solving the Problems

A train car-to-car communication device includes: a terminal provided in a composition including one or more cars for transmitting and receiving information; an intra-composition transmission line connected to the terminal within the same composition for transmitting the information; a composition-to-composition communication relay unit connected to the intra-composition transmission line for receiving first information as the information from the terminal within the composition and transmitting the first information to the other adjacent composition, and receiving second information as the information from the other adjacent composition and transmitting the second information to the terminal within the composition of interest; and a composition-to-composition transmission line for connecting the composition-to-composition communication relay units of the adjacent compositions and transmitting the information, and the composition-to-composition communication relay unit includes composition direction determining means for determining a difference between composition directions of the composition as a transmission source of the received information and the composition directions of the composition to which the composition-to-composition communication relay unit of interest belongs, and direction-dependent information rewriting means for rewriting to invert direction-dependent information contained in the received information if the composition direction determining means determines that the composition directions are different.

Advantages of the Invention

The invention can continue communication processing without disruption of communication processing even when compositions having different composition directions are coupled because the direction-dependent information rewriting means rewrites direction-dependent information contained in a communication packet when composition directions of adjacent compositions are different.

BRIEF DESCRIPTION OF THE DRAWINGS

FIG. 1 A configuration diagram of a train car-to-car communication device showing embodiment 1 of the invention.

FIG. 2 An explanatory diagram of a composition-to-composition communication relay unit of embodiment 1 of the invention.

FIG. 3 An explanatory diagram of the composition-to-composition communication relay means of embodiment 1 of the invention.

FIG. 4 An explanatory diagram of composition-to-composition relay detouring means of embodiment 1 of the invention.

FIG. 5 An explanatory diagram of a terminal and monitor-controlled instruments of embodiment 1 of the invention.

FIG. 6 An explanatory diagram of a packet of embodiment 1 of the invention.

FIG. 7 An explanatory diagram of criteria of composition direction determination of embodiment 1 of the invention.

FIG. 8 A configuration diagram of a train car-to-car communication device of embodiment 1 of the invention.

FIG. 9 An explanatory diagram of packets of embodiment 1 of the invention.

FIG. 10 An explanatory diagram of packets of embodiment 1 of the invention.

FIG. 11 A configuration diagram of a train car-to-car communication device of embodiment 2 of the invention.

FIG. 12 A configuration diagram of a composition-to-composition communication relay unit of embodiment 2 of the invention.

FIG. 13 An explanatory diagram of criteria of composition direction determination of embodiment 2 of the invention.

FIG. 14 A configuration diagram of a train car-to-car communication device of embodiment 3 of the invention.

FIG. 15 A configuration diagram of a composition-to-composition communication relay unit of embodiment 3 of the invention.

FIG. 16 A configuration diagram of a train car-to-car communication device of embodiment 4 of the invention.

FIG. 17 An explanatory diagram of an IP address of embodiment 4 of the invention.

FIG. 18 An explanatory diagram of IP addresses of transmission ports of embodiment 4 of the invention.

FIG. 19 An explanatory diagram of criteria of composition direction determination of embodiment 4 of the invention.

FIG. 20 A configuration diagram of a train car-to-car communication device of embodiment 4 of the invention.

FIG. 21 An explanatory diagram of a terminal and monitor-controlled instruments of embodiment 4 of the invention.

FIG. 22 An explanatory diagram of packets of embodiment 4 of the invention.

DESCRIPTION OF REFERENCE NUMERALS AND SIGNS 1, 1a, 1b composition-to-composition communication relay unit
2 direction-dependent information rewriting means
3 composition direction information adding means
4 composition number adding means
5 composition direction determining means
15, 15a, 15b composition-to-composition transmission port
15c intra-composition transmission port
16 composition-to-composition relay unit detouring means
19 composition-to-composition communication relay means
20, 20a, 20b intra-composition car-to-car transmission line
21, 21a, 21b composition-to-composition transmission line
30, 30x, 30y terminal
31, 31a, 31b transmission port
32 instrument
33 receiving part
34 transmitting part
40, 40a, 40b, 40c, 40d car
41 composition
101 data
102 transmission source composition number
103 transmission source composition direction information

BEST MODE FOR CARRYING OUT THE INVENTION

Embodiment 1

FIG. 1 is a configuration diagram showing a train car-to-car communication device in the embodiment. In the drawing, a composition 41 includes at least one car 40, and four cars 40a to 40d in FIG. 1. The composition 41 refers to a unit of train that is not divided at operation including one or more cars 40, and plural compositions 41 may be coupled in a train.

The composition 41 is provided with a composition-to-composition communication relay unit 1 that transmits and receives information between compositions 41. Further, a composition-to-composition transmission line 21 is provided as a transmission line that connects between the composition-to-composition communication relay units 1 of different compositions 41 and transmits information. Each car 40 includes at least one terminal 30. The composition-to-composition communication relay unit 1 within and the respective terminals 30 within the composition are connected by an intra-composition car-to-car transmission line 20.

The composition-to-composition communication relay unit 1 relays information transmitted from another composition through the composition-to-composition transmission line 21 (21a) to the terminals 30 within the respective cars 40 via the intra-composition car-to-car transmission line 20. Further, the unit relays it to yet another composition 41 via another composition-to-composition transmission line 21 (21b) than the composition-to-composition transmission line 21 (21a) through which the transmitted information has been received.

Furthermore, the composition-to-composition communication relay unit 1 relays information sent from the terminal 30 via the intra-composition car-to-car transmission line 20 to another composition via the composition-to-composition transmission line 21.

The terminal 30 receives the information from the composition-to-composition communication relay unit 1 via the intra-composition car-to-car transmission line 20 and controls each cars 40. Further, the composition 41 is provided with composition-to-composition transmission lines 21a, 21b for communication with adjacent compositions 41.

The information contains computer-processable data, and may be a packet as a unit of divided data flowing in a network layer or a transport layer.

As below, the respective units will be described. FIG. 2 shows a configuration of the composition-to-composition communication relay unit 1. As in the drawing, the composition-to-composition communication relay unit 1 includes two composition-to-composition transmission ports 15a, 15b, an intra-composition transmission port 15c, and composition-to-composition communication relay means 19 connected to the ports. The composition-to-composition communication relay means 19 relays information to another composition 41 via the composition-to-composition transmission ports 15a, 15b, and relays information to the terminals 30 within the composition via the intra-composition transmission port 15c.

FIG. 3 shows an example of a configuration of the composition-to-composition communication relay means 19. In FIG. 3(A), the composition-to-composition communication relay means 19 has composition direction determining means 5 and direction-dependent information rewriting means 2.

When relaying the information received from another composition 41 adjacent to the composition 41 itself, if the composition direction is different from that of the adjacent composition 41, the composition-to-composition communication relay means 19 performs rewriting to invert the direction-dependent information in the information sent from the other composition. If the composition direction is the same as that of the adjacent composition 41, the means do not perform rewriting to invert the direction-dependent information but relays the information as it is. The composition-to-composition communication relay means 19 has the composition direction determining means 5 and the direction-dependent information rewriting means 2 in order to realize that.

When relaying the information received from another adjacent composition 41, if the other adjacent composition 41 as a transmission source of the information and the composition 41 of interest to which the composition-to-composition communication relay means 19 belongs are different in composition direction, the composition direction determining means 5 determines that the directions are different, and if the composition directions are the same, the means determines that the directions are the same.

Conceivable information as criteria of determination of the composition direction in the composition direction determining means 5 is (1) information of a physical form of a coupling unit between compositions or cars, and information equivalent to results from physical performance with electric signals, (2) information that the composition-to-composition communication relay means 19 of the composition 41 as the transmission source adds composition direction information to the transmission information, or the like. For example, for (1), a depression or the like indicating the first or second direction is provided in a predetermined location of a coupler and a mechanism of reading the depression is provided in a predetermined location of a corresponding coupler. From the result read by the reading mechanism, whether the direction of the coupled partner is the first or second direction is obtained, and the difference in composition direction is determined according to the direction of the coupled partner and whether the direction of the coupler of interest of the cars of its own is the first or second direction. Specifically, if the first and the second directions are the same, the composition directions can be determined to be different, and if the first and the second directions are different, the composition directions can be determined to be the same. In place of the depression, electric signals may be used for discrimination of the first or second direction.

Here, the agreement and disagreement in composition direction may be determined according to a relationship relative to the adjacent composition only, and may not necessary to be determined in view of absolute directions such as "up" and "down". Whether the direction-dependent information is inverted or not may be determined according to the relationship relative to the adjacent composition only. Further, it is necessary to explicitly change the settings according to train operation for determination in view of absolute directions such as "up" and "down", however, when the determination is made in view of the relationship relative to the adjacent composition, there is an advantage that the setting change is not necessary because the settings determined when the composition is determined do not change in the later operation.

If the directions are determined to be the same in the composition direction determining means 5, the composition-to-composition communication relay means 19 outputs (relays) the information as it is. If the directions are determined to be different, the composition-to-composition communication relay means 19 allows the direction-dependent information rewriting means 2 to rewrite the received information and outputs (relays) the rewritten information.

The direction-dependent information rewriting means 2 performs rewriting to invert the direction-dependent information in the received information. As below, rewriting of the direction-dependent information will be described.

The direction-dependent information refers to discrimination information forming a pair for determining the position, direction, etc. within the composition and is determined with reference to the composition direction. The pair for determining the position, direction, etc. within the composition is, for example, "front" and "rear", "left" and "right", "upstream" and "downstream", or the like. The composition direction is a direction from the rear toward the front in an anteroposterior positional relationship uniquely determined according to the configuration of the composition. As long as the definition is consistent, the direction may be defined as "a direction from the front to the rear". In the direction-dependent information, the above "left" and "right" are defined so that, as one faces the composition direction, the left may be "left" and the right may be "right".

For instance, regarding the composition direction of one composition, it may be assumed that the front side as one sees the door defined as "right" on the right side is the first direction and the rear side is the second direction. Then, when two compositions are coupled, if both of the directions toward the coupled point in the respective compositions are the first direction, the directions are determined to be different in the composition direction determining means 5. On the other hand, if the direction is the first direction in one of two compositions and the direction of the other is the second direction, the directions are determined to be the same in the composition direction determining means 5.

Further, inverting the direction-dependent information is to change one value of the direction-dependent information to the other value in the pair. Specifically, the information meaning "front" is rewritten to information meaning "rear", the information meaning "left" to information meaning "right", and the information meaning "upstream" to information meaning "downstream".

FIG. 3(B) shows a configuration of another composition-to-composition communication relay means 19. In the drawing, the composition-to-composition communication relay means 19 is configured to have composition direction information adding means 3 in addition to that described above.

When the composition-to-composition communication relay unit 1 relays information (containing packets) to another composition 41, the composition direction information adding means 3 adds information on the direction of the adjacent composition 41 to be relayed as viewed from the composition 41 as the transmission source, i.e., the composition 41 to which the composition-to-composition communication relay unit 1 belongs.

For instance, if the transmission direction in the composition to which the composition-to-composition communication relay unit 1 belongs is the second direction in the above example, the means adds information indicating the second direction. If the information is transmitted in the opposite direction, the means adds information indicating the first direction. That is, composition direction information to be added changes according to the transmission direction.

The composition 41 receiving the information to which the composition direction information has been added can compare the direction at the reception side and the composition direction information added to the received information and determine whether the composition directions are in agreement or not. For instance, if the reception side of the receiving composition 41 is the first direction and the information indicating the second direction has been added to the received information, the composition directions are determined to be the same in the composition direction determining means 5.

In this manner, the composition direction determining means 5 may determine whether or not the direction is the same as the direction of the adjacent composition from the information of the composition direction added in the composition direction information adding means 3 and the direction of the reception side. The composition-to-composition communication relay means 19 rewrites the information in the direction-dependent information rewriting means 2 if the composition directions are different.

FIG. 3(C) shows a configuration of another composition-to-composition communication relay means 19. In the drawing, the composition-to-composition communication relay means 19 may be configured to have composition number adding means 4 in addition to that described above.

When the composition-to-composition communication relay unit 1 relays information to another composition 41, the composition number adding means 4 adds the composition number of the composition 41 as the transmission source, i.e., the composition to which the composition-to-composition communication relay unit 1 of interest belongs. Here, the composition number is a number assigned for discrimination of the individual composition in advance and unique in one train.

The composition number adding means 4 is provided and the composition-to-composition communication relay means 19 detects the change of the number of the adjacent composition 41, and thereby, each composition-to-composition communication relay unit 1 can detect the change of the adjacent composition 41.

The processing can be simplified utilizing the above described composition number. Specifically, the composition direction determining means 5 is activated when the adjacent composition 41 is changed, whether the composition direction is the same as that of the adjacent composition or not is determined, and the result is stored in the composition-to-composition communication relay means 19. Afterwards, until the adjacent composition 41 is changed, the direction-dependent information rewriting means 2 is activated to rewrite the information if the information stored in the composition-to-composition communication relay means 19 indicates the different direction. When the composition-to-composition communication relay means 19 detects that the adjacent composition 41 is changed from the composition number of the received information, the means activates the composition direction determining means 2 to store the determination result. According to the configuration, the composition direction determining means 2 is not necessary to be constantly activated and the processing can be simplified.

Next, the composition-to-composition relay unit detouring means 16 will be described. FIG. 4 shows a configuration of the composition-to-composition relay unit detouring means 16. The composition-to-composition relay unit detouring means 16 shown in the drawing is provided in a train car-to-car communication network. The composition-to-composition relay unit detouring means 16 includes two switches 18 for switching between a detour path 17 and a transmission line. The two switches 18 respectively have two statuses of a status of connecting the composition-to-composition transmission line 21 and the detour path 17 and a status of connecting the composition-to-composition transmission line 21 and the composition-to-composition communication relay unit 1. Hereinafter, the route connecting the composition-to-composition transmission line 21 and the detour path 17 is referred to as a detour path-side route and the route connecting the composition-to-composition transmission line 21 and the composition-to-composition communication relay unit 1 is referred to as a composition-to-composition communication relay unit-side route.

The composition-to-composition relay unit detouring means 16 monitors the operating condition of the composition-to-composition communication relay unit 1. During the monitoring, in the normal condition, both of the switches 18 are set to the composition-to-composition communication relay unit-side route. During the monitoring, when an abnormality of the composition-to-composition communication relay unit 1 is sensed, the switches 18 are set to the detour path-side route. In the latter case, the composition-to-composition transmission lines 21a and 21b are directly connected, and thereby, both adjacent compositions 41 are directly connected around the composition 41 of interest.

The composition-to-composition relay unit detouring means 16 may be adapted to sense an abnormality by determining that there is an abnormality when power-off of the composition-to-composition communication relay unit 1 is sensed or the number of errors of a watch dog timer exceeds a certain number.

By configuring the composition-to-composition relay unit detouring means 16 as described above, even when the composition-to-composition communication relay unit 1 malfunctions, transmission can be made between both adjacent compositions 41 and availability can be improved.

Further, when the above described composition-to-composition relay unit detouring means 16 is set to the detour path-side circuit, the composition-to-composition communication relay unit 1 has the composition number adding means 4 and can sense that the adjacent composition has been changed. For instance, in the case where composition A, composition B, and composition C are coupled in the order of A, B, and C, when transmission is normally made, the transmission source composition number of the packet received by the composition C is the number of the composition B. When the composition B malfunctions, the switches 18 are set to the detour path-side circuit in the composition-to-composition relay unit detouring means 16, and the composition number of the packet received by the composition C is the number of the composition A. Therefore, in the composition C, the change of the packet transmission source can be known and the change of adjacent compositions can be sensed.

Next, each terminal within the composition will be described. FIG. 5 shows a configuration of the terminal 30 and monitor-controlled instruments 32. In the drawing, the terminal 30 has a transmission port 31. The transmission port 31 is connected to the composition-to-composition communication relay means 19 via the intra-composition transmission port 15c. The terminal 30 is connected to plural monitor-controlled instruments 32 and performs monitor-control processing of the connected instruments. The monitor-controlled instrument 32 includes an instrument for which contents being monitor-controlled and targets being monitor-controlled are designated according to direction-dependent information such as doors and motors determined with the composition direction as reference.

Next, a flow of information (containing packets) on the network of the train car-to-car communication device will be described.

First, a flow when a packet is transmitted from the terminal 30 will be explained. The terminal 30 transmits data including information necessary for monitor-control containing direction-dependent information as a packet toward a communication destination terminal 30. When the communication destination is a terminal 30 within the composition 41, the transmitted packet passes through the intra-composition car-to-car transmission line 20 and reaches the target terminal 30 without passing through the composition-to-composition communication relay unit 1.

When the communication destination is a terminal 30 of another composition 41, the packet transmitted from the terminal 30 passes through the intra-composition car-to-car transmission line 20, reaches the composition-to-composition communication relay unit 1 of the composition 41 of interest, and is received at the intra-composition transmission port 15c of the composition-to-composition communication relay unit 1. When the information transmitted from the terminal 30 within the composition 41 of interest is received at the intra-composition transmission port 15c, the composition direction determining means 5 or the direction-dependent information rewriting means 2 is not activated. In the case where there are the composition direction information adding means 3 and the composition number adding means 4 of the composition-to-composition communication relay means 19, as shown in FIG. 6, transmission source composition direction information 103 and transmission source composition number 102 are respectively added to the received packet containing the direction-dependent information. The composition-to-composition communication relay means 19 relays (transmits) the packet to one or both of the composition-to-composition transmission ports 15a and 15b.

The composition-to-composition communication relay unit 1 of the other adjacent composition 41 as the transmission destination receives the packet from the adjacent composition 41 from one of the composition-to-composition transmission port 15a and 15b. The receiving composition-to-composition communication relay unit 1 relays the packet received from the composition-to-composition transmission port 15 to the intra-composition transmission port 15c and the other composition-to-composition transmission port 15 (15a or 15*b*) than the port that has received the packet of interest. In this regard, the composition-to-composition communication relay means 19 activates the direction-dependent information rewriting means 2 if the determination by the composition direction determining means 5 or the stored composition direction determination result indicates the different direction. The direction-dependent information rewriting means 2 inverts the direction-dependent information contained in the data part of the packet if the transmission source composition direction information 103 contained in the packet is different from the composition direction of the composition of interest.

When relaying the packet received from the adjacent composition 41 to the intra-composition transmission port 15*c*, the composition-to-composition communication relay means 19 removes the transmission source composition direction information 103 and transmission source composition number 102 from the received packet and relays the data part only.

Further, for the relay to the composition-to-composition transmission port 15*a* or 15*b*, the composition direction information adding means 3 and the composition number adding means 4 rewrite the transmission source composition direction information 103 and transmission source composition number 102 of the received packet to the composition direction and the composition number of the composition 41 of interest, respectively, and relay them.

As the composition direction information added by the composition direction information adding means 3, for example, port numbers of the composition-to-composition transmission ports 15*a*, 15*b* within the composition-to-composition communication relay unit 1 in FIG. 2 may be used. The composition direction information is information indicating the direction of the adjacent composition 41 as the transmission source in the composition 41 itself, and values indicating the composition-to-composition transmission ports 15*a*, 15*b* of the same composition 41. Note that, regarding the number provided to the composition-to-composition transmission port 15, arrangement that the front side as one sees the "right" door at the right side is "a" and the rear side is "b" ("the first direction" and "the second direction" in the above description) between the compositions 41 having possibilities to be coupled is made and the number is set on the same basis.

When the settings are as described above, agreement and disagreement in composition direction between the adjacent composition 41 as the transmission source and the composition 41 of interest are obtained by criteria in FIG. 7. That is, if the composition direction information of the composition-to-composition transmission port 15 as the transmission source and the composition direction information of the receiving composition-to-composition transmission port 15 in the composition 41 itself are the same, the composition directions of them are in disagreement (opposite directions). If the composition direction information is different, the composition directions of them are determined to be in agreement (the same direction).

A method of storing the transmission source composition direction information 103 of the adjacent composition 41 when the composition condition is changed without including the transmission source composition direction information 103 in the packet in FIG. 6, and allowing the composition direction determining means 5 to determine the composition direction based thereon may be used. However, when the composition direction of the adjacent composition 41 is changed due to coupling, dividing, changes in condition of the switches 18 of the composition-to-composition relay unit detouring means 16, etc., there are possibilities of receiving the packet transmitted after the change before the change reaches the composition direction determining means 5, and receiving the packet transmitted before the change after the change reaches the composition direction determining means 5. When the packet is transmitted before the change in composition direction reaches the composition direction determining means 5, if the time of determination of the composition direction and the time of creation of the packet are different, processing may be inconsistent, that is, monitor-control that is supposed to be performed may be impossible. On the other hand, in the method of including the composition direction information in the packet, information as determination reference for composition direction is added when the packet is created, and, when the connection condition between the composition 41 and the composition 41 is changed, the change is transmitted together with the packet as a target of processing based on the information. Accordingly, there is an advantage that the processing is held consistent.

Further, the location where the direction-dependent information is stored may be determined with respect to each kind of packets, and the direction-dependent information storage location by kind of packets may be stored in the composition-to-composition communication relay unit 1. Thus configured, the composition-to-composition communication relay unit 1 can specify the direction-dependent information to be rewritten. Otherwise, adding format information representing the storage location of the direction-dependent information with respect to each packet enables the composition-to-composition communication relay unit 1 to rewrite the direction-dependent information.

As another method, a method of defining rewriting necessity information representing necessity to rewrite the direction-dependent information as a flag in a packet is conceivable. The rewriting necessity information is handled as direction-dependent information and set to rewriting target data by the direction-dependent information rewriting means 2. Specifically, if the composition direction determining means 5 determines that the composition direction is different, the flag of the rewriting necessity information is inverted. Then, the other composition direction information contained in the packet is not set to the rewriting target by the direction-dependent information rewriting means 2 when the composition-to-composition communication relay means 19 transmits the packet to the other composition 41, and the rewriting necessity information is set to the rewriting target.

When the composition-to-composition communication relay means 19 relays the packet to the intra-composition car-to-car transmission line 20, referring to the rewriting necessity information, and, if rewriting is necessary, the direction-dependent information rewriting means 2 rewrites the direction-dependent information within the packet and rewrites the rewriting necessity information to represent that the rewriting is unnecessary. According to the configuration, there is an advantage that processing is performed at a high speed because, in the case of relaying the compositions 41, the rewriting necessity information may be rewritten but rewriting of direction-dependent information requiring processing in a great amount is not performed.

Further, a method of not rewriting the direction-dependent information contained in the packet when the composition-to-composition communication relay means 19 relays the packet to the intra-composition car-to-car transmission line 20 but, in the terminal 30 receiving it and provided with the direction-dependent information rewriting means 2, rewriting the direction-dependent information according to the rewriting necessity information may be possible. In this case, the terminal 30 that has first received the packet may sense the rewriting necessity information represents that rewriting is necessary, rewrite the direction-dependent information and rewrite the rewriting necessity information to represent that the rewriting is unnecessary, and transmits the packet to the downstream. Alternatively, not the terminal 30 that has first received but the terminal 30 first utilizing the monitor-control information in the packet or the like in the transmission order may sense the rewriting necessity information representing that rewriting is necessary, rewrite the direction-dependent information and rewrite the rewriting necessity information to represent that the rewriting is unnecessary, and transmits the packet to the downstream. According to the configuration, there are advantages that, when no packet is utilized within the composition, processing of rewriting the direction-dependent information is not necessary and the amount of processing in the entire system can be reduced.

Next, processing of the terminal 30 receiving the packet will be described. In the terminal 30 receiving the packet, the direction of the monitor-control target of the monitor-controlled instrument 32 is determined (the monitor-controlled instrument 32 is specified) based on the direction-dependent information, and monitor-control is performed. The direction-dependent information is rewritten in the composition-to-composition communication relay unit 1 based on the composition directions of the composition 41 as the data transmission source and the composition 41 itself. Therefore, in the terminal 30 within the composition 41, the received direction-dependent information can be interpreted as it is and used.

Further, in the terminal 30, in processing of recording control condition and malfunction information relating to the direction-dependent information, the direction-dependent information can be used without special rewriting. For instance, when a command of recording malfunction information of a door in the terminal 30 is issued from another composition, the terminal 30 may record the direction information of the door and the malfunction information of the door of the composition 41 itself based on the direction-dependent information.

When the recording information is loaded from the same composition as the composition in which the information has been recorded in the recorded information, the recorded direction of the door can be specified from the composition direction of the composition 41 and the direction-dependent information within the recorded information. When the recording information is loaded from the composition different from the composition in which the information has been recorded in the recorded information, the composition direction determining means 5 of the composition-to-composition communication relay means 19 allows the direction-dependent information rewriting means 2 to rewrite the direction-dependent information within the recorded data according to the connection direction of the compositions, and thereby, the recorded direction of the door can be specified from the composition direction of the composition from which the information has been loaded and the direction-dependent information within the recorded information. In either case, to analyze the recorded information, the information for specifying the composition from which the information has been loaded may be managed together with the recorded information.

Next, a procedure of transmitting door control information in (the network configuration of) the above described train car-to-car communication device will be specifically described as below.

FIG. 8 shows a configuration of a train car-to-car communication device used in the description. In the drawing, compositions 41A, 41B, 41C are coupled in this order. The composition directions of the composition 41A and composition 41B are opposite and the composition directions of the composition 41B and composition 41C are the same. As below, the procedure of transmitting door control information will be described by taking the case as an example.

The terminal 30 of each composition 41 has a connection transmission channels a, b for monitor-control of a door left 32a and a door right 32b, respectively. The discrimination information of the door left and the door right is direction-dependent information. For instance, when the composition direction is changed relative to the reference such as the rail track, the physical positions of the doors relative to the reference (rail track) are switched. In other words, the physical positions of the doors relative to the rail track corresponding to the door left as the direction-dependent information are opposite to each other between the composition A and the composition B in the different composition directions. Further, the physical positions of the doors relative to the rail track corresponding to the door left as composition-dependent information are the same between the composition B and the composition C in the same composition direction.

Regarding the case where a packet of "right door-open" (FIG. 9(A)) from a certain terminal 30 of the composition 41A, processing of the respective parts will be described along the flow of the packet. The packet to be transmitted is door control information intended to open the doors in the same direction with reference to the rail track.

The packet transmitted from the terminal 30 of the composition 41A reaches the intra-composition transmission port 15c of the composition-to-composition communication relay unit 1 of the composition 41A. The transmission source composition number 102 and the transmission source composition direction information 103 are added to the received packet by the composition number adding means 4 and the composition direction information adding means 3 of the composition-to-composition transmission relay means 19. In this regard, the port number (a or b) of the composition-to-composition transmission port 15 outputting the packet is added as the transmission source composition direction information 103. In the drawing, at transmission from the composition-to-composition transmission port 15a, a is added (in the case of the drawing). Further, at transmission from the composition-to-composition transmission port 15b, b is added. The respective packets are shown in FIGS. 9(C), (B).

The packet transmitted from the composition-to-composition transmission port 15a of the composition 41A (FIG. 9(C)) passes through the composition-to-composition transmission port 15a of the composition 41B and reaches the composition-to-composition communication relay means 19 of the composition 41B. Here, the composition direction determining means 5 of the composition 41B compares the transmission source composition direction information 103 of the received packet (FIG. 9(C)) and the port number of the composition-to-composition transmission port 15a that has received it. As a result of the comparison, the composition directions of the composition 41A as the transmission source and the composition 41B itself are known to be opposite because they are the same such that they are a and a. Therefore, the composition-to-composition communication relay means 19 uses the direction-dependent information rewriting means 2 to invert the "door right" as the direction-dependent information within the packet and rewrites it to "door left" (FIG. 9(D)).

Then, the transmission source composition direction information 103 and the transmission source composition number 102 are removed from the above packet (FIG. 9(D)) by the composition-to-composition communication relay means 19 of the composition 41B (FIG. 10(A)). The packet with the information removed (FIG. 10(A)) is transmitted from the intra-composition transmission port 15c to the intra-composition car-to-car transmission line 20 of the composition 41B. The terminal 30 of the composition 41B controls the doors to open according to the "door left-open" contained in the received packet (FIG. 10(A)).

"b" as the transmission source composition direction information 103 is added to the above packet (FIG. 10(A)) by the composition direction information adding means 3 of the composition-to-composition communication relay means 19 of the composition 41B, and B is added thereto as the transmission source composition number 102 by the composition number adding means 4 (FIG. 10(B)). Then, the above packet (FIG. 10(B)) is transmitted from the composition-to-composition transmission port 15b of the composition 41B, and passes through the composition-to-composition transmission port 15a of the composition 41C and reaches the composition-to-composition communication relay means 19.

Here, the composition direction determining means 5 of the composition-to-composition communication relay means 19 of the composition 41C compares the transmission source composition direction information 103 of the received packet (FIG. 14(B)) and the port number of the composition-to-composition transmission port 15a that has received it, and determines that the composition directions of the composition as the transmission source and the composition itself are the same. In this case, the composition-to-composition communication relay means 19 does not activate the direction-dependent information rewriting means and the above packet remains as it is (FIG. 10(C)).

Then, the transmission source composition direction information 103 and the transmission source composition number 102 are removed from the above packet (FIG. 10(C)) by the composition-to-composition communication relay means 19 of the composition 41C (FIG. 10(A)). The packet with the information removed (FIG. 10(A)) is transmitted from the intra-composition transmission port 15c to the intra-composition car-to-car transmission line 20 of the composition 41C. The terminal 30 of the composition 41C controls the doors to open according to the "door left-open" contained in the received packet (FIG. 10(A)).

Since the train car-to-car communication device operates in the above described manner, the packet of "door right-open" is rewritten to "door right-open", "door left-open", "door left-open" in the composition 41A, the composition 41B, the composition 41C, respectively, and transmitted to the terminals 30 within the respective compositions 41A, 41B, 41C. As a result, the door control packets are transmitted to the doors in the physically same direction in all compositions relative to the rail track as reference.

As above, the composition-to-composition communication relay means 19 and the terminal 30 are realized in separate units, however, a configuration in which one of the terminals 30 mounted on the car at the end of the composition performs the function of the composition-to-composition communication relay means 19 may be possible. In this case, there are advantages that the number of component elements is reduced, the transmission lines are not complex, and the device can be made compact.

According to the above described configuration, there are advantages that the terminal 30 within the composition 41 may only monitor-control the instruments connected according to the direction-dependent information, and processing of rewriting the direction-dependent information is not necessary in the respective terminals 30 and instruments 32.

Normally, when the direction-dependent information is performed in the terminals 30 and instruments 32, it is necessary that the composition direction of the composition 41 belonging thereto and the composition direction of the composition 41 as the transmission source have been clear. However, when the information is inconsistent among the terminals 30 and the instruments 32, the correct operation is not performed. In a transitional condition such as coupling and division of the compositions 41, a mechanism for agreement of recognitions of the composition directions in the terminals 30 and the instruments 32 is necessary. However, the terminals 30 and the instruments 32 as targets for agreement of recognitions are distributed, and the mechanism for agreement of recognitions becomes complex and the probability that an error occurs becomes higher.

In the conventional train car-to-car communication network, it is necessary to disrupt the communication during execution of processing of inverting the recognition in communication relay units within one composition until the inversion of recognition is completed in all communication relay units. When the center is disrupted, a problem of delay of processing occurs. Further, to disrupt the communication, it is necessary to provide complicated means for reliable disruption during communication processing and means for confirmation of completion of inversion of the recognition in all communication relay units. Therefore, there are problems that the time for communication disruption increases and errors become easier to occur due to the means for reliable disruption during communication processing and the means for confirmation of completion of inversion of the recognition in all communication relay units.

Furthermore, in the conventional train car-to-car communication network, when three or more compositions are coupled and disconnection and connection of the transmission lines repeatedly occur due to contact failure of couplers and the like before the inversion of the recognition is completed in the communication relay units, the inversion processing of direction recognition falls into a state of repeated execution and becomes unable to perform stable operation.

According to the embodiment, the train car-to-car communication device rewrites direction-dependent information in the composition-to-composition communication relay unit 1 and needs no processing of determining whether rewriting the direction-dependent information is necessary or not in the respective terminals 30, and thus, it is not necessary to perform processing of inverting the recognition in the communication relay unit within one composition. Accordingly, the processing can be executed without disrupting the communication. Therefore, there is an advantage that the communication processing can be executed without the conventional problem of processing delay, problem of increase in the time for communication disruption, or problem that errors become easier to occur.

Further, according to the embodiment, in the composition-to-composition communication relay unit 1, the direction-dependent information is rewritten, and since there is no need for processing of determining whether rewriting the direction-dependent information is necessary or not in the respective terminals 30, even when three or more compositions are coupled and disconnection and connection of the transmission lines repeatedly occur due to contact failure of couplers and the like, there is an advantage that there is no inversion processing of direction recognition and stable operation can be performed.

According to the embodiment, the train car-to-car communication device rewrites direction-dependent information in the composition-to-composition communication relay unit 1, and thereby, it is not necessary to rewrite the direction-dependent information in the respective terminals 30 according to the direction of the composition 41 itself. Therefore, there is an advantage that, even when the condition of the train car-to-car communication device (or network) is not stable at coupling or the like, the operation does not become unstable.

For instance, in the case where a packet containing direction-dependent information is sent from the other composition 41 immediately after coupling to the other composition 41, in the composition 41 that has received the packet, the composition direction determining means 5 determines the necessity of rewriting of the direction-dependent information from the composition direction of the composition 41 itself and the composition direction information within the packet and, if necessary, the direction-dependent information rewriting means 2 rewrites the information, and therefore, there is no need to disrupt the communication and processing in the respective terminals 30.

Further, even when coupling to and separation from adjacent compositions are repeated due to contact failure of couplers between the compositions 41 or the like, the necessity of rewriting is determined according to the composition direction information within the information, and thus, the direction-dependent information within the packet that has been normally sent from the other composition 41 can be correctly interpreted in the respective terminals 30.

Furthermore, when switching of the switches 18 within the composition-to-composition relay unit detouring means 16 shown in FIG. 4 is frequently performed, the necessity of rewriting of direction-dependent information is determined with respect to each packet, and thus, there is no difference between the recognition of the change in composition direction of the adjacent composition 41 and the determination of the necessity of rewriting of direction-dependent information. Therefore, the direction-dependent information can be correctly interpreted in the respective terminals 30.

Moreover, since the necessity of rewriting of direction-dependent information within transmitted information is performed according to the composition direction information within the information of interest, there is an advantage that the train car-to-car communication network can stably operate in the transitional period when the operation becomes easily unstable at change in composition, switching of detour paths, or the like.

Embodiment 2

In the above described embodiment, there is one composition-to-composition communication relay unit 1 in the composition 41, however, there may be two of them in the same composition 41.

FIG. 11 is a configuration diagram showing a train car-to-car communication device in the embodiment 2. Further, FIG. 12 is a configuration diagram showing a composition-to-composition communication relay unit 1 as a main part of the train car-to-car communication device. The same numerals are assigned to the same component elements as those in the above described embodiment.

In FIG. 11, the compositions 41, the cars 40 (40a to 40d), the terminals 30, the composition-to-composition transmission lines 21 are the same as those in the above described embodiment. As below, the description of differences will be centered.

The composition-to-composition communication relay units 1 are provided on both ends of the intra-composition car-to-car transmission line 20, and there are two of them in the composition 41. The composition-to-composition communication relay unit 1 includes one composition-to-composition transmission ports 15a, an intra-composition transmission port 15c, and composition-to-composition communication relay means 19 as in FIG. 12.

Further, the detour path 17 and the switches 18 of the composition-to-composition relay unit detouring means 16 are provided around both of the two composition-to-composition communication relay units 1 provided within the composition 41.

The items that are not described in the embodiment basically have the same configuration as those in the embodiment 1 and perform the same operation.

Next, a flow of a packet in the train car-to-car communication device of the embodiment will be described. First, the terminal 30 transmits data including information necessary for monitor-control containing direction-dependent information as a packet. When the communication destination is a terminal 30 within the composition 41, the transmitted packet passes through the intra-composition car-to-car transmission line 20 and reaches the target terminal 30 without passing through the composition-to-composition communication relay unit 1.

When the communication destination is a terminal 30 of another composition 41, the transmitted packet passes through the intra-composition car-to-car transmission line 20 and reaches both of the two composition-to-composition communication relay units 1 existing within the composition 41 of interest. Afterwards, the same operation is performed in any of the composition-to-composition communication relay units 1. The composition-to-composition communication relay unit 1 receives the packet from the intra-composition transmission port 15c. As shown in FIG. 6, the composition-to-composition communication relay means 19 adds the transmission source composition direction information 103 and transmission source composition number 102 to the received packet (FIG. 6) containing the direction-dependent information, and transmits and relays the packet from the composition-to-composition transmission port 15a.

The composition-to-composition communication relay unit 1 of the adjacent composition 41 receives the packet (FIG. 6) from the adjacent composition 41 from the composition-to-composition transmission port 15a. The composition-to-composition communication relay unit 1 of the composition 41 that has received the packet relays the packet received from the composition-to-composition transmission port 15a to the intra-composition transmission port 15c. In this regard, the composition-to-composition communication relay means 19 uses the composition direction determining means 5 to compare the transmission source composition direction information 103 contained in the packet and the composition direction information of the composition-to-composition communication relay unit 1 of interest in the composition 41 of interest and determines whether the composition direction is the same or not. If the information different from the composition direction of the composition 41 of interest, the direction-dependent information rewriting means 2 performs rewriting to invert the direction-dependent information contained in the data part of the packet.

When relaying the packet received from the adjacent composition to the intra-composition transmission port 15c, the means removes the transmission source composition direction information 103 and transmission source composition number 102 from the packet in FIG. 6 and relays the data part only to the intra-composition car-to-car transmission line 20 of the composition 41 of interest.

Further, for the relay from the composition-to-composition transmission port 15a to the other adjacent composition, the composition direction information adding means 3 and the composition number adding means 4 rewrite the transmission source composition direction information 103 and transmission source composition number 102 of the received packet to the composition direction and the composition number of the composition of interest, respectively.

Here, a method of determining the difference between the transmission source composition direction information 103 and the composition direction will be described. It is assumed that the composition direction information adding means 2 writes an identifier of the composition-to-composition communication relay unit 1 that performs relay processing with reference to the composition direction wherein an identifier of the composition-to-composition communication relay unit 1 at the front side is a and an identifier of the other one is b. Here, the front side may be considered to be the front side as one sees the side set to "right" in the composition at the right side, for example.

The criteria for determining whether the composition direction is the same as that of the composition 41 itself are shown in FIG. 13. If the identifier of the composition-to-composition communication relay unit 1 as the transmission source and the identifier of the composition-to-composition communication relay unit 1 that has received the packet are the same, the composition directions are determined to be opposite to each other. Further, if the identifier of the transmission source and the receiving composition-to-composition communication relay unit 1 are not in agreement, the composition directions are determined to be the same.

As above, the composition-to-composition communication relay means 19 and the terminal 30 are realized in separate units, however, a configuration in which the terminals 30 mounted on the car at both ends of the composition 41 realize the function of the composition-to-composition communication relay means 19 may be possible.

In the embodiment, as is the case of the above described embodiment, there is an advantage that the train car-to-car communication device can stably operate in the transitional period when the operation becomes easily unstable at change in the composition 41, switching of detour paths, or the like.

Embodiment 3

In the above described embodiments, the terminal 30 is described to have one transmission port, however, the terminal 30 may be configured to have two transmission ports and manage the right of use of the intra-composition car-to-car transmission line 20 through circulation of a token packet.

FIG. 14 is a configuration diagram showing a train car-to-car communication device in the embodiment 3. Further, FIG. 15 is a configuration showing a composition-to-composition communication relay unit 1 as a main part of the train car-to-car communication device. The same numerals are assigned to the same component elements as those in the above described embodiment. Further, the compositions 41, the cars 40 (40*a* to 40*d*), the terminals 30, the composition-to-composition transmission lines 21 are the same as those in the above described embodiment. As below, the description of differences will be centered.

The terminal 30 has two transmission ports 31*a* and 31*b*, and these transmission ports are connected to adjacent cars 40 via the intra-composition car-to-car transmission line 20*a*. As below, with the configuration, the train car-to-car communication device that manages the right of use of the intra-composition car-to-car transmission line 20*a* (network) through circulation of a token packet is considered. Here, the token packet is a control packet for exclusively using the network. The network can be used in a period after the terminal 30 receives the token packet and before transmits it to another terminal 30.

The terminal 30 recognizes the transmission port 31*a* at the upstream and the transmission port 31*b* at the downstream with reference to the composition direction within the composition of interest. When receiving the token packet, the terminal 30 transfers the token packet according to the direction indicated in the token packet, i.e., either of the direction from upstream to downstream or the direction from downstream to upstream. Further, the composition-to-composition communication relay unit 1 can define an identifier (a or b) with reference to the composition direction as is the case of the embodiment 2. For instance, the upstream side of the transmission port 31 may be defined as "a" and the downstream side may be defined as "b".

In a train having the train car-to-car communication device with the above described configuration, the circulation of the token packet when two compositions in the different composition directions are coupled will be described as below. Note that the token packet contains information on the token packet transfer direction. The information on the token packet transfer direction is direction-dependent information.

The terminal 30 that starts token packet transmission may be determined according to the rule that "to set to either of the most upstream or the most downstream within the composition", for example. When the terminal 30 that starts token packet transmission is set to the terminal 30 at the most upstream within the composition, the terminal 30 that starts token packet transmission sets the token packet transmission direction to "from upstream to downstream". On the other hand, when the terminal 30 that starts token packet transmission is set to the terminal 30 at the most downstream within the composition, the terminal 30 that starts token packet transmission sets the token packet transmission direction reversely to "from downstream to upstream".

As below, the case where the terminal 30 that starts token packet transmission is set to the terminal 30 at the most upstream within the composition will be described, however, the same processing can be performed in the reverse case by exchanging "upstream" with "downstream".

The token packet transmitted from the most upstream terminal 30 is transmitted from the transmission port 31*b* at the downstream side. The adjacent terminal 30 receives the packet from the transmission port 31*a* at the upstream side and transmits it to the transmission port 31*b* at the downstream side according to the token packet transmission direction ("from upstream to downstream") contained in the received token packet. After the processing is repeated, the token packet is transmitted from the port 31*b* of the most downstream terminal 30 within the composition. The composition-to-composition communication relay unit 1*b* receives the token packet through the intra-composition transmission port 15*c*.

The composition direction information adding means 2 and the composition number adding means 4 of the composition-to-composition communication relay means 19 of the composition-to-composition communication relay unit 1*b* adds the transmission source composition direction information 103 and the transmission source composition number 102 to the token packet, and transmits it from the composition-to-composition transmission port 15*a* via the composition-to-composition transmission line 21 to the adjacent composition-to-composition communication relay unit 1. Here, as the transmission source composition direction information 103, the identifier b of the composition-to-composition communication relay unit 1b may be set as is the case of the embodiment 2.

In the composition-to-composition communication relay means 19 of the adjacent composition 41 that has the packet from the composition-to-composition transmission port 15a, the composition direction determining means 5 determines the difference in composition direction according to the same method as the method shown in FIG. 13 of the above described embodiment 2. When the composition direction determining means 5 determines that the composition directions are different, the direction-dependent information rewriting means 2 inverts the direction-dependent information. Here, the direction-dependent information to be inverted contains the token packet transfer direction.

The description here is on the assumption that the two composition directions are opposite, and accordingly, the token packet transfer direction within the token packet is rewritten to "downstream to upstream".

The token packet is transmitted from the intra-composition transmission port 15c of the composition-to-composition communication relay unit 1 via the intra-composition car-to-car transmission line 20a. In this example, the composition directions are oppositely connected, and thus, the token packet is received from the transmission port 31b, i.e., from the downstream side of the terminal 30. The terminal 30 transfers the token packet according to the token packet transfer direction contained in the token packet, i.e., the direction "from downstream to upstream". Therefore, the token packet is transmitted from the transmission port 31a at the upstream side via the intra-composition car-to-car transmission line 20a.

In this manner, even when the composition directions are different between compositions, the direction-dependent information rewriting means 2 of the composition-to-composition communication relay means 19 inverts the token packet transfer direction as the direction-dependent information, and thereby, the token packet can be circulated to all terminals 30 within the train. Further, when compositions are coupled, the processing of inverting the recognitions of composition directions of all terminals 30 and instruments 32 within one composition 41 is not necessary.

In the above description, the composition-to-composition communication relay means 19 and the terminal 30 are realized in separate units, however, a configuration in which the terminals 30 mounted on the car 40 at both ends of the composition 41 realize the function of the composition-to-composition communication relay means 19 may be possible.

As is the case of the above described embodiments, there is an advantage that the train car-to-car communication device of the embodiment can stably operate in the transitional period when the operation becomes easily unstable at change in composition, switching of detour paths, or the like.

Further, since the embodiment handles the token packet transfer direction as the direction-dependent information as well with the configuration to manage the right of use of the intra-composition car-to-car transmission line 20a, there is an advantage that the communication can be stably made using the token packet when the operation becomes easily unstable at change in composition or the like.

Embodiment 4

In the above described embodiments, the intra-composition car-to-car transmission line 20 and the composition-to-composition transmission line 21 are not multiplexed, however, in the embodiment, an embodiment with improved reliability by multiplexing the units relating to transmission lines and transmission will be described.

FIG. 16 is a configuration diagram showing a train car-to-car communication device of the embodiment. Further, FIG. 21 is a configuration diagram showing a terminal 30 and monitor-controlled instruments 32 connected the terminal of the embodiment. In the drawing, the train car-to-car communication device has a configuration in which the intra-composition car-to-car transmission lines 20 (20a, 20b) the composition-to-composition transmission line 21, the composition-to-composition communication relay unit 1 and the transmission port 31 of the terminal 30 in the above described embodiment 1 are respectively multiplexed. Further, two transmission ports 31a, 31b of the terminal 30 are connected to the intra-composition car-to-car transmission lines 20a, 20b, respectively. Furthermore, the terminal 30 includes a receiving part 33 and a transmitting part 34 that controls the two transmission ports 31a, 32b. As below, the respective multiplexed systems are called "system 1" and "system 2".

According to the above configuration, independent two transmission lines are secured in both between the terminals 30 within the composition 41 and the terminals 30 in the different compositions 41, and thus, there is an advantage that the reliability is improved.

The composition-to-composition communication relay unit 1 has the component elements shown in FIG. 2 as has been described in the embodiment 1. Of them, the component elements of the composition-to-composition communication relay means 19 are as shown in FIG. 3. Further, the composition-to-composition relay unit detouring means 16 has the configuration as shown in FIG. 4.

When two compositions 41 are coupled, if the composition directions are the same, the composition-to-composition transmission lines 21a of the system 1 and the composition-to-composition transmission line 21b of the system 2 in the respective compositions 41 are connected. However, if the composition directions are opposite, the composition-to-composition transmission line 21a of the system 1 of one composition 41 is connected to the composition-to-composition transmission line 21b of the system 2 of the other composition 41.

All of identification information of the intra-composition car-to-car transmission lines 20a, 21b, identification information of the composition-to-composition transmission lines 21a, 21b, identification information of the composition-to-composition communication relay units 1a, 1b, and identification information of the transmission ports 31a, 31b of the terminal 30 are direction-dependent information determined with reference to the composition direction. For instance, in the embodiment, the intra-composition car-to-car transmission lines 20a, the composition-to-composition transmission lines 21a, the composition-to-composition communication relay unit 1a, and the transmission port 31a of the terminal 30 are called "system 1" and the intra-composition car-to-car transmission lines 20b, the composition-to-composition transmission lines 21b, the composition-to-composition communication relay unit 1b, and the transmission port 31b of the terminal 30 are called "system 2".

In the above configuration, a method of realizing IP communication between terminal 30 will be described as below. As shown in FIG. 21, the terminals includes the two transmission ports 31a, 31b. FIG. 17 shows configurations of IP addresses of the transmission ports 31a, 31b of the respective terminals 30. As in the drawing, "system" (system 1 or system 2) to which the transmission port 31 belongs, "composition number" of the composition 41, and "intra-composition car number" of the terminal 30 within the composition 41 are reflected in the IP address.

FIG. 18 shows examples of IP addresses assigned to the transmission ports 31 (31*a*, 31*b*) of the respective terminals 30 in the composition 41 in FIG. 16. Here, the composition number is set to one. Further, it is necessary to set the network mask so that the plural transmission ports 31*a*, 31*b* connected to the same terminal 30 may be respectively assigned to different sub-networks. This is because, if these are assigned to the same sub-network, when transmitting an IP packet, the terminal 30 is unable to determine from which transmission port 31 to transmit the IP packet. Accordingly, here, 255.255.0.0 is assigned to the transmission ports 31*a*, 31*b* of the terminal 30 as the network mask.

The method of realizing the composition number adding means 3 in transfer processing of the packet in the composition-to-composition communication relay unit 1 is the same as that illustrated in the embodiment 1. Further, the composition direction information adding means 4 adds information of the system to which the composition-to-composition communication relay unit 1 of interest belongs as transmission source composition direction information 103.

When receiving the packet from the composition-to-composition transmission port 15*a* or 15*b*, the composition direction determining means 5 determines the difference in composition direction between the adjacent composition 41 and itself (necessity of rewriting of direction information) based on FIG. 19. If determined that the composition directions are different (rewriting of direction information is necessary), the composition-to-composition communication relay means 19 activates the direction-dependent information rewriting means 2 and rewrites to invert the direction-dependent information contained in the packet. Here, the direction-dependent information also contains information of addresses corresponding to all systems of IP addresses (systems of "system 1", "system 2" as above). The system is determined depending on the composition direction. For instance, in the respective compositions, the right side as one faces the composition direction is set to "system 1". Further, at coupling, the systems at the same side relative to the rail track are connected. Accordingly, when compositions are coupled, it is possible that the system 1 of one composition and the system 2 of the other composition may be connected.

FIG. 20 shows a configuration in which compositions with composition numbers 1 and 2 are coupled in the different composition directions from each other. As below, a flow of a packet when the terminal 30*x* of the car number 1 of the composition number 1 in the configuration in FIG. 20 makes IP communication with the terminal 30*y* of the car number 4 of the composition number 2.

First, the terminal 30*x* designates the IP address of the terminal 30*y* as the destination and outputs an IP packet. Here, transmission by designating 10.2.1.4 assigned to one of the transmission ports 31 of the terminal 30*y* is assumed and described as below.

Since the sub-network address of the IP address 10.2.1.4 of the destination is 10.2.0.0, the terminal 30*x* transmits the IP packet from the transmission port 31 at the system 2 side of the terminal 30*x*. At this time, 10.2.1.1 is stored as the IP address of the transmission source.

FIG. 22(A) shows a configuration of the packet at transmission. In the drawing, for explanation, the IP packet part contained in the transmitted packet is extracted and, of the headers, the IP address storage areas of the destination and the transmission source are shown and the rest thereof is shown as data.

Then, the above packet (FIG. 22(A)) is received in the intra-composition transmission port 15*c* by the composition-to-composition communication relay unit 1*b* of the composition number 1. The composition direction information adding means 3 of the composition-to-composition communication relay unit 1*b* adds the information representing the system receiving in the composition-to-composition communication relay unit 1*b* of interest, i.e., the system 2 as the transmission source composition direction information 103. Further, the composition number adding means 4 adds the composition number 1 as the transmission source composition number 102. The packet to which the information has been added as described above is information formed by adding the transmission source composition direction information 103, the transmission source composition number 102 to the information of FIG. 22 (A) as shown in FIG. 22(B). Thus configured packet (FIG. 22(B)) is transmitted from the composition-to-composition transmission ports 15*a*, 15*b*.

Then, the above packet (FIG. 22(B)) is received in the composition-to-composition transmission ports 15*a*, 15*b* of the composition-to-composition communication relay unit 1*a* of the composition number 2 as the composition adjacent to the above composition 41. At this time, the composition direction determining means 5 determines that the composition directions are different based on the determination criteria in FIG. 19 because the transmission source composition direction information 103 is system 2 and the direction information of the composition 41 itself is system 1. Then, the composition-to-composition communication relay means 19 activates the direction-dependent information rewriting means 2 and rewrites to invert the direction-dependent information contained in the packet. At this time, the information part of the system of the destination IP address and the transmission source IP address contained in the packet is rewritten to be inverted. Specifically, 10.2.1.4 is rewritten to 10.1.1.4, and 10.2.1.1 to 10.1.1.1.

Further, when the received packet is transferred to another composition-to-composition transmission port 15 than the receiving one of the composition-to-composition communication relay unit 1, the composition direction information adding means 3 and the composition number adding means 4 rewrite the transmission source composition direction information 103 and the transmission source composition number 102 to contents of the composition itself, i.e., the systems 1 and 2, respectively. Thus configured packet is shown in FIG. 22(C).

Furthermore, when the received packet is transferred to the intra-composition car-to-car transmission lines 20, the transmission source composition direction information 103 and the transmission source composition number 102 are removed from FIG. 22(C) in which the IP address has been rewritten, and the rest thereof is transmitted. Thus configured packet is shown in FIG. 22(D).

Then, the above packet (FIG. 22(D)) is transmitted to the intra-composition car-to-car transmission lines 20*a* of the system 1 of the composition of the composition number 2, and received at the transmission port 31*a* at the system 1 side of the terminal 30*y* of the car number 4 of the composition of the composition number 2 having the destination address of 10.1.1.4.

Unless direction-dependent information has been rewritten, the packet shown in FIG. 22(A) is transmitted from the composition-to-composition communication relay unit 1*a* of the system 1 of the composition 2 to the intra-composition car-to-car transmission lines 20*a* of the system 1. However, in the packet, the sub-network address of the destination IP address is the system 2. That is, it remains 10.2.0.0, and this is transmitted to the intra-composition car-to-car transmission lines 20a of the system 1. However, the sub-network of the transmission port 31 of the system 1 of the terminal 30y is 10.1.0.0 of the system 1, and thus, is unable to receive the packet or make communication.

Next, using FIG. 21, the operation of the receiving part 33 and the transmitting part 34 of the terminal 30 in the embodiment will be described. The transmitting part 34 of the terminal 30x assigns a sequence number to a packet to be transmitted. Then, part transmits packets to which the same sequence number has been assigned to IP addresses assigned to the two transmission ports 31a, 31b of the terminal 30y as destinations, respectively. Then, the terminal 30y receives one packet having the same sequence number from each one of the transmission ports 31a, 31b of the system 1 and system 2.

Here, the receiving part 33 of the terminal 30y handles the received two packets in the following manner.
(1) If the sequence number of the received packet is new, the part handles it as received data.
(2) If not, the part discards it.

Even when failure occurs in one intra-composition car-to-car transmission lines 20 (20a, 20b) and transmission becomes disabled due to the above handling, in the terminal 30y handling the received data, processing relating to reception can be continued without change and the reliability is improved.

Further, the receiving part 33 of the terminal 30y may be configured to handle the received two packets in the following manner.
(1) If the sequence number of the received packet is new, the part waits for a predetermined time until receiving a packet with the same sequence number.
(2) Unless the part receives a packet with the same sequence number within the predetermined time, the part discards the packet.
(3) If the part receives a packet with the same sequence number within the predetermined time,
(i) the part compares contents of both packets and handles them as received data if they agree.
(ii) unless they agree, the part discards it.

By handling in the above described manner, errors due to unintended changes in packet contents in the transmission lines can be detected, and thus, communication with high reliability can be realized.

In the above description, the composition-to-composition communication relay means 19 and the terminal 30 are realized in separate units, however, a configuration in which the terminals 30 mounted on the car 40 at both ends of the composition realize the function of the composition-to-composition communication relay means 19 may be possible.

In the embodiment, as is the case of the above described embodiments 1 to 3, there is an advantage that the train car-to-car communication device of the embodiment can stably operate in the transitional period when the operation becomes easily unstable at change in composition, switching of detour paths, or the like.

Further, according to the embodiment, since the composition-to-composition communication relay unit 1 includes the composition direction determining means 5 and the direction-dependent information rewriting means 2 and has multiplexed transmission lines, there is an advantage that processing can be continued and stably processing can be performed even when the compositions in the different composition directions are coupled and one system has a trouble.

The invention claimed is:
1. A train car-to-car communication device comprising:
a terminal provided in a composition including one or more cars of a train for transmitting and receiving information;
an intra-composition transmission line connected to the terminal within same composition for transmitting the information;
a composition-to-composition communication relay unit connected to the intra-composition transmission line for receiving first information as information from the terminal within the composition and transmitting the first information to the other adjacent composition, and receiving second information as information from the other adjacent composition and transmitting the second information to the terminal within the composition of interest; and
a composition-to-composition transmission line for connecting composition-to-composition communication relay units of adjacent compositions and transmitting the information,
wherein the composition-to-composition communication relay unit includes composition direction determining means for determining a difference between composition directions of composition as a transmission source of received information and the composition to which the composition-to-composition communication relay unit of interest belongs, and direction-dependent information rewriting means for rewriting to invert direction-dependent information contained in the received information if the composition direction determining means determines that the composition directions are different, wherein the direction-dependent information is a discrimination information of door left and door right.

2. The train car-to-car communication device according to claim 1, wherein, when the adjacent compositions are coupled to both sides of the composition to which the composition-to-composition communication relay unit belongs, the composition-to-composition communication relay unit transmits the information to the other adjacent composition different from the composition as the transmission source of the received information.

3. The train car-to-car communication device according to claim 1, wherein the composition-to-composition communication relay unit includes transmission source composition direction adding means for adding composition direction information representing the composition direction to the information when transmitting the information to the other adjacent composition, and
the composition direction determining means makes determination by comparing the composition direction information of the composition to which the composition direction determining means of interest belongs and the composition direction information of the received information.

4. The train car-to-car communication device according to claim 1, wherein the composition-to-composition communication relay unit includes composition number adding means for adding a composition number that has assigned to the composition to which the composition-to-composition communication relay unit of interest belongs in advance to the information when transmitting the information to the other adjacent composition, and activates the composition direction determining means to store a determination result determined by the composition direction determining means if there is a change when detecting the change in the composition number of the received information, and executes the direction-dependent information rewriting means if the stored determination result shows the different composition directions.

5. The train car-to-car communication device according to claim 1, further comprising composition-to-composition relay unit detouring means for configuring the composition-to-composition transmission line so as to directly connect the adjacent compositions at both sides when the adjacent compositions are connected at both sides of the composition.

6. The train car-to-car communication device according to claim 1, further comprising two composition-to-composition communication relay units.

7. The train car-to-car communication device according to claim 1, wherein the terminal comprising two transmission parts to manage right of use of the intra-composition transmission line through circulation of a token packet.

8. The train car-to-car communication device according to claim 1, further comprising two systems of the intra-composition transmission line, the composition-to-composition transmission line, and the composition-to-composition relay unit, wherein the terminal includes transmitting and receiving parts for controlling two transmission parts connected to the intra-composition transmission lines of the respective systems.

9. The train car-to-car communication device according to claim 8, wherein the terminal transmits information to which same sequence number has been added at information transmission from the two transmitting parts of the two systems and processes information to which a new sequence number has been added at information reception.

10. The train car-to-car communication device according to claim 8, wherein the terminal transmits information to which same sequence number has been added at information transmission from the two transmitting parts of the two systems and, if one transmitting part receives information to which a new sequence number has been added at information reception, waits for a predetermined time for the other transmitting part to receive information to which the same sequence number has been added, and, when receiving information of interest, compares the information received by the two receiving parts and processes the information received by the two receiving parts in agreement.

* * * * *